United States Patent
Fusella et al.

(10) Patent No.: US 8,244,959 B2
(45) Date of Patent: Aug. 14, 2012

(54) SOFTWARE ADAPTED WEAR LEVELING

(75) Inventors: Yves Fusella, Aubagne (FR); Stephane Godzinski, Peynier (FR); Laurent Paris, Rousset (FR); Jean-Pascal Maraninchi, Marseilles (FR); Samuel Charbouillot, Pourrieres (FR)

(73) Assignee: Atmel Rousset S.A.S., Rousset (FR)

( * ) Notice: Subject to any disclaimer, the term of this patent is extended or adjusted under 35 U.S.C. 154(b) by 690 days.

(21) Appl. No.: 12/268,383

(22) Filed: Nov. 10, 2008

(65) Prior Publication Data

US 2010/0122015 A1    May 13, 2010

(51) Int. Cl.
*G11C 11/34*    (2006.01)
*G06F 12/00*    (2006.01)

(52) U.S. Cl. ............... 711/103; 365/185.3; 365/185.29; 365/185.33; 711/170; 711/171; 711/172; 711/173

(58) Field of Classification Search ............ 365/185.3, 365/185.29, 185.33; 711/103, 170, 171, 711/172, 173
See application file for complete search history.

(56) References Cited

U.S. PATENT DOCUMENTS

| | | | | |
|---|---|---|---|---|
| 5,479,638 A * | 12/1995 | Assar et al. | | 711/103 |
| 5,485,595 A * | 1/1996 | Assar et al. | | 711/103 |
| 6,000,006 A * | 12/1999 | Bruce et al. | | 711/103 |
| 7,106,636 B2 | 9/2006 | Eilert et al. | | |
| 7,372,736 B2 * | 5/2008 | Lee et al. | | 365/185.18 |
| 7,804,718 B2 * | 9/2010 | Kim | | 365/185.29 |
| 7,975,109 B2 * | 7/2011 | McWilliams et al. | | 711/147 |
| 2005/0281095 A1 | 12/2005 | Eilert et al. | | |
| 2006/0282610 A1 | 12/2006 | Dariel et al. | | |
| 2006/0288153 A1 | 12/2006 | Tanaka et al. | | |
| 2007/0208904 A1 * | 9/2007 | Hsieh et al. | | 711/103 |
| 2008/0140918 A1 | 6/2008 | Sutardja | | |

* cited by examiner

*Primary Examiner* — Kevin Ellis
*Assistant Examiner* — Mehdi Namazi
(74) *Attorney, Agent, or Firm* — Fish & Richardson P.C.

(57) ABSTRACT

A subset of software objects stored in a first segment of non-volatile memory are identified as requiring frequent write operations or otherwise associated with a high endurance requirement. The subset of software objects are move to a second segment of non-volatile memory with a high endurance capacity, due to the application of wear leveling techniques to the second segment of non-volatile memory. The first and second segments of memory can be located in the same memory device or different memory devices.

19 Claims, 9 Drawing Sheets

SOFTWARE ADAPTED WEAR LEVELING

TECHNICAL FIELD

This subject matter is generally related to non-volatile memory wear leveling techniques.

BACKGROUND

Secure microcontrollers can contain Read Only Memory (ROM) for software program storage and Electrically Erasable Programmable Read-Only Memory (EEPROM) for data storage. The EEPROM technology increases dramatically in cost when reduced to sub-micron size, causing some secure micro-controllers to move to a different non-volatile memory technology, such as flash, which is less costly to shrink. Flash technology, in particular, can additionally allow for greater design flexibility because no ROM mask processing is needed.

Using an EEPROM, data can be erased and/or written by byte if necessary. In flash memories, as little as a single byte of data can be written, but the memory can only be erased by page or by block (e.g., according to the particular flash memory architecture). The software within the secure microcontroller would have to perform a read-modify-write operation on the page (or the block) to emulate a single byte data update.

After a number of erases, a non-volatile memory cell will wear out. The memory endurance of a flash memory cell (e.g., 100,000 erases, 10,000 erases, etc.), for example, depends upon manufacturing factors. Various hardware and/or software techniques may be utilized to extend the lifetime of non-volatile memory. For example, wear leveling techniques can be applied to average the writes across the memory cells. Memory cell usage, for example, can be rotated to ensure that individual memory cells are not exposed to greater than average erasures. Wear leveling techniques can incur slower response times, however, because of software management requirements. The slower response times can, in some situations, cause slower software functionality (e.g., in the situation in which program and data are both stored within a non-volatile memory).

SUMMARY

A subset of software objects stored in a first segment of non-volatile memory are identified as requiring frequent write operations or otherwise have a high endurance requirement. The subset of software objects are move to a second segment of non-volatile memory having a high endurance capacity, due to the application of wear leveling techniques to the second segment of non-volatile memory. The first and second segments of memory can be located in the same memory device or different memory devices.

DETAILED DESCRIPTION

Example Embedded Non-Volatile Memory Implementation

Figure 1:
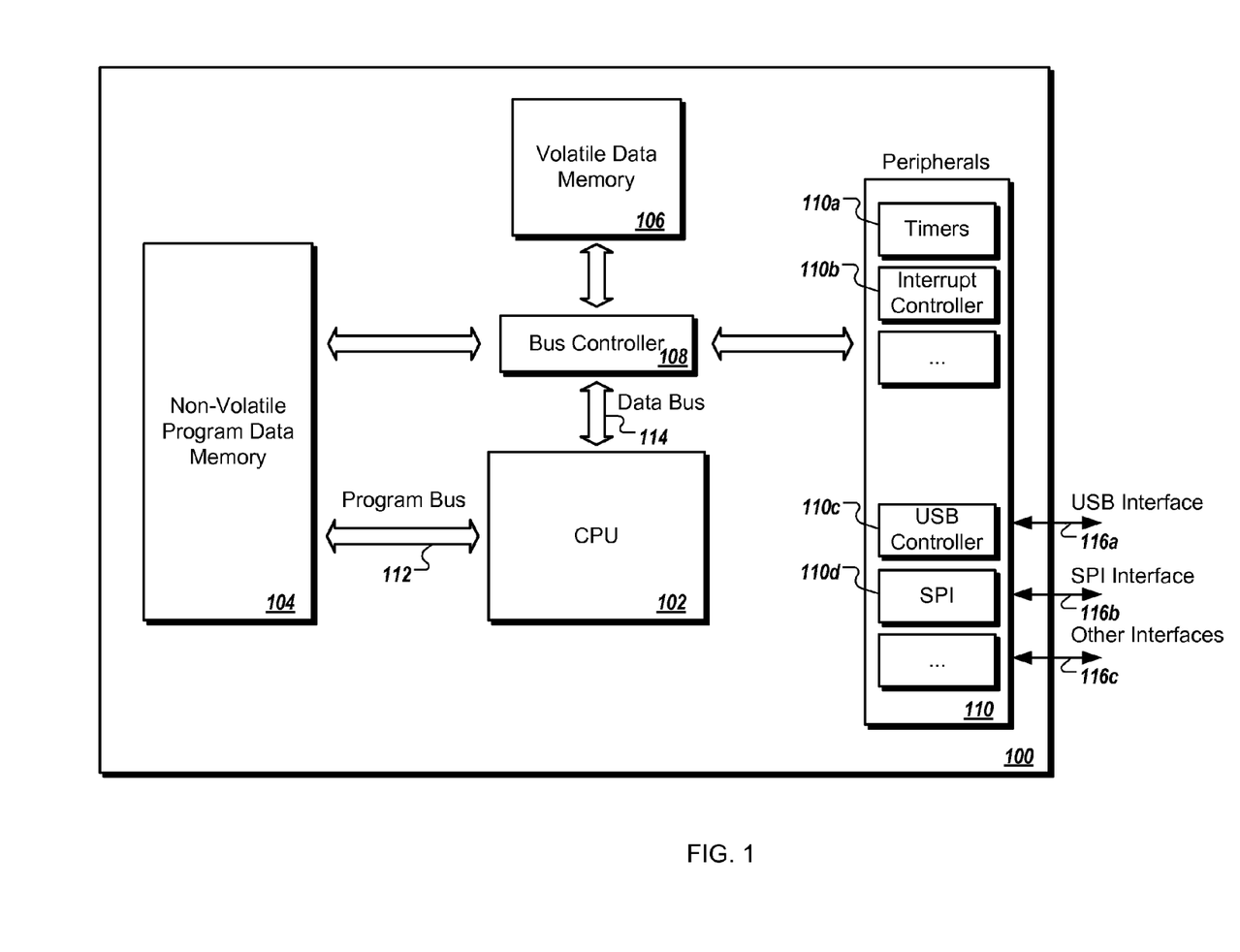
FIG. 1 illustrates an example of a microcontroller with an embedded non-volatile memory.

FIG. 1 illustrates an example of a microcontroller 100 with an embedded non-volatile memory 104. The microcontroller 100 can be used within an electronic device such as, for example, a handheld computing device (e.g., mobile telephone, personal data assistant, etc.), secure identification card (e.g., banking card, building access badge, etc.), or small consumer appliance (e.g., kitchen appliance, power tool, electronic toy, media player, etc.). In some implementations, the microcontroller 100 can be used for the storage and sharing of secure data (e.g., a USB drive).

The microcontroller 100 can include a central processing unit (CPU) 102 which executes program instructions stored in non-volatile memory 104 (e.g., Flash), and communicates with volatile data memory 106 (e.g., SRAM) and one or more peripheral devices 110 such as, for example, one or more timers 110a, an interrupt controller 110b, a Universal Serial Bus (USB) controller 110c, a system packet interface (SPI) 110d or any other interface.

The CPU 102 receives the program instructions over a program bus 112 and transfers data across a data bus 114. A bus controller 108 controls data traffic between the CPU 102, the non-volatile memory 104, the volatile data memory 106, and the peripheral devices 110. One or more peripheral devices 110 can couple to external devices through one or more interfaces 116 (e.g., a USB interface 116a, an SPI interface 116b, and/or an other interface 116c). The interfaces 116, for example, can include circuitry for implementing wired and/or wireless data connections.

The microcontroller 110 can include more, fewer, or different elements than illustrated within FIG. 1. For example shown, the non-volatile memory 104 can be implemented using two logically and/or physically separate embedded memories which may include two different non-volatile memory technologies. The separate embedded memories, for example, can be used to store different types of information (e.g., program code, data).

Figure 2:
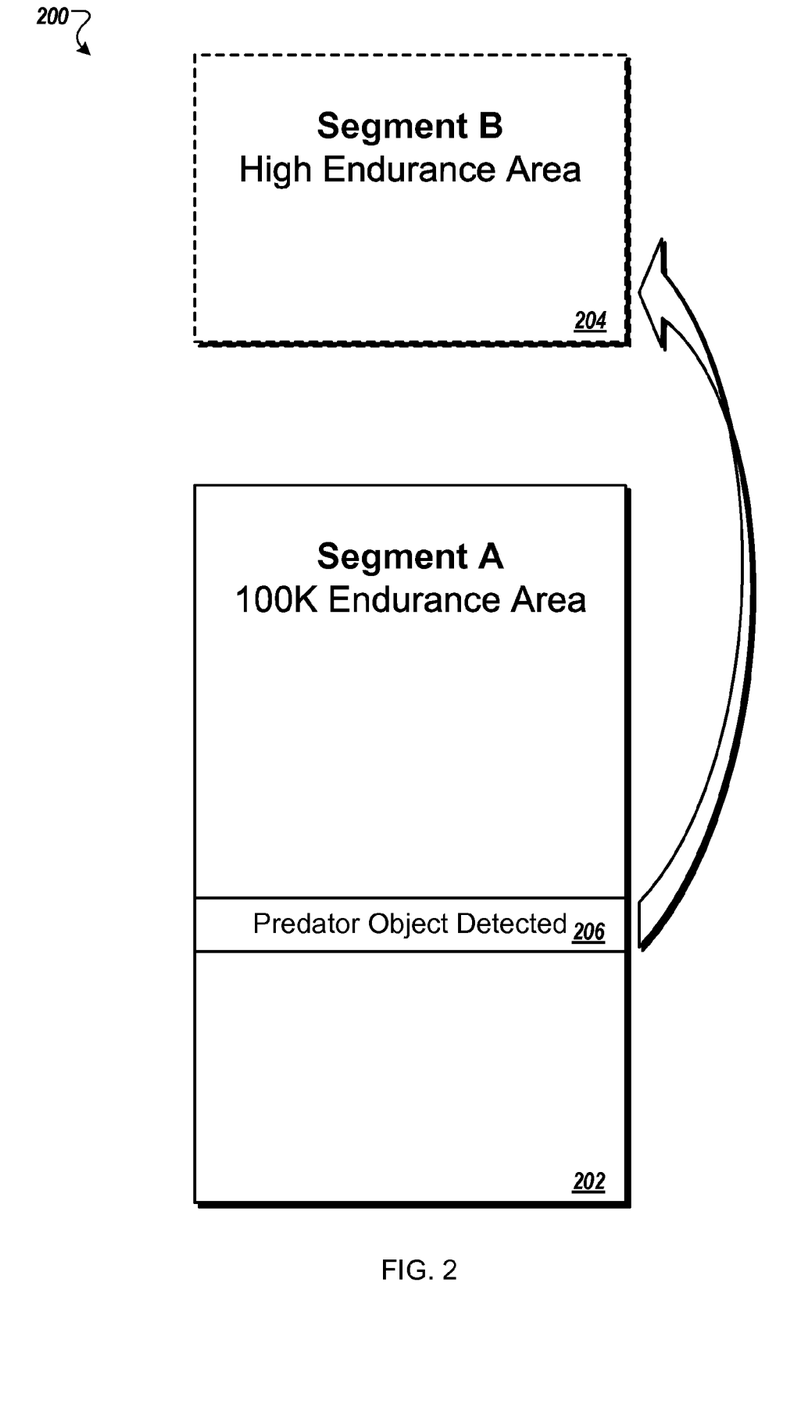
FIG. 2 illustrates an example of remapping a non-volatile memory predator from a first memory segment to a second memory segment.

FIG. 2 illustrates remapping of a predator object 206 from a main non-volatile memory segment 202 to a high endurance, non-volatile memory segment 204 within an embedded non-volatile memory system 200. The embedded non-volatile memory system 200, for example, can be included within a microcontroller (e.g., the non-volatile memory 104). The memory system 200 can be a well known flash memory system (e.g., JFFS2, YAFFS, UDF).

The predator object 206, as used herein, is a software object that is subject to frequent write operations and has an endurance requirement that is higher than the technology endurance capacity of the non-volatile memory in which the predator object 206 resides. Non-volatile memory can endure a predetermined number of erasures before failure, commonly referred to as the endurance of the memory technology. Non-volatile memory can have an endurance capacity specified by a manufacturer, for example, of 100,000 write cycles per memory cell. When the predator object 206 residing within a first memory segment 202 of non-volatile memory is close to the endurance capacity of the non-volatile memory (e.g., 100,000 write cycles), the predator object 206 is moved to a second memory segment 204 that has a higher endurance capacity (hereinafter also referred to as an "endurance tank") than the endurance capacity of the first memory segment 202. The logical address of the relocated predator object 206 is remapped to the new physical address of the predator object 206 in the second memory segment 204, so that the predator object 206 can be accessed by the memory system 200 in response to a read/write request from a processor (e.g., CPU 102).

The predator object 206, if left at the same location within the non-volatile memory, can quickly exceed the endurance capacity of the non-volatile memory. As disclosed herein, a detection routine can be used to detect the predator object 206 within the first memory segment 202 of non-volatile memory and relocate the predator object 206 to the second, high endurance, memory segment 204. Certain predator objects are known to require frequent write operations, such as a file allocation table (FAT) of a file system. In some implementations, these "natural" predator objects 206 can be automatically placed into the high endurance segment 204 during initialization of the memory system 200 or otherwise identified as predator objects.

In some implementations, the high endurance, non-volatile memory segment 204 is a logical partition of the same embedded memory as the first or main non-volatile memory segment 202. For example, the high endurance, non-volatile memory segment 204 can be statically sized (e.g., at time of microcontroller manufacture) based upon an anticipated percentage of high erase count software objects or dynamically sized (e.g., through a software setting) while predator objects are moved and remapped within the non-volatile memory system 200.

In some implementations, the high endurance, memory segment 204 is physically separate from the non-volatile memory segment 202. The high endurance, non-volatile memory segment 204, for example, can have a higher endurance capacity and/or memory cells created using a different technology than the technology of the memory cells of the non-volatile memory segment 202. For example, the non-volatile memory segment 202 can be implemented using 100K endurance flash technology, while the high endurance, non-volatile segment 204 can be implemented using 100M endurance SONOS technology. In some implementations, the high endurance, non-volatile memory segment 204 can have a different block size and/or erasing mechanism than the non-volatile, memory segment 202. For example, the high endurance, non-volatile memory segment 204 could be page-erasable while the non-volatile memory segment 202 is block-erasable.

In some implementations, one or more wear-leveling techniques can be applied to the high endurance, non-volatile memory segment 204 to increase the overall endurance. For example, the high endurance, non-volatile memory segment 204 can be sized such that the relocated predator objects are significantly smaller in number than the total number of memory blocks within the high endurance, non-volatile memory segment 204. In this manner, the memory block contents can be rotated amongst memory blocks, increasing the overall effective endurance of the high endurance, non-volatile memory segment 204 to be greater than the physical endurance of the individual memory blocks of the high endurance, non-volatile memory segment 204. In some implementations, the high endurance, non-volatile memory segment 204 has a higher total memory capacity than the main non-volatile memory segment 202.

Figure 3:
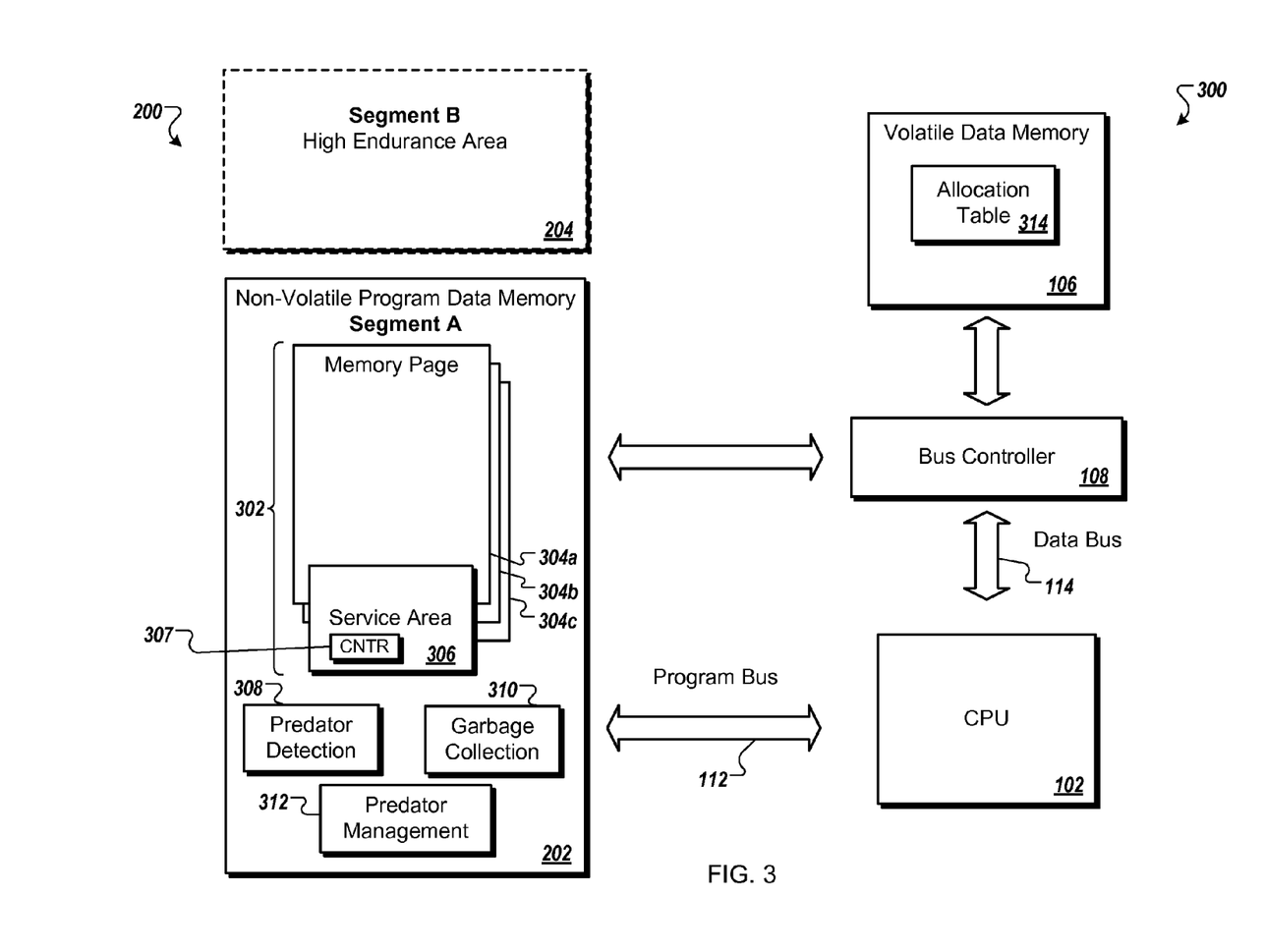
FIG. 3 illustrates an example system within a microcontroller with an embedded non-volatile memory for identifying and managing memory predators.

FIG. 3 illustrates an example microcontroller architecture 300 including a segmented embedded non-volatile memory system 200 for identifying and managing predator objects. The microcontroller architecture 300, for example, could be used within the microcontroller 100 of FIG. 1. The microcontroller architecture 300 includes the memory system 200 which further includes the main non-volatile memory segment 202, the high endurance, non-volatile memory segment 204, the CPU 102, the bus controller 108, and the volatile data memory 106.

The main non-volatile memory segment 202 includes a collection of memory blocks such as an example memory block 302. The example memory block 302 contains one or more pages of memory 304 and a service area 306. The service area 306 can include an erase counter 307 which is incremented each time the memory block 302 is erased. In other implementations, separate erase counters can be maintained for each page 304 within the memory block 302.

The main non-volatile memory segment 202 additionally includes a predator detection engine 308. The predator detection engine 308 can compare the erase counter 307 within the service area 306 to an endurance threshold value (e.g., also stored in the service area 306), using a hardware or software-based detection routine. When the erase counter 307 hits the endurance threshold value the predator detection engine 308 can alert a predator management engine 312.

The predator management engine 312 reallocates the memory block 302 to the high endurance, non-volatile memory segment 204. The predator management engine 312 can store the address of the new location of the memory block 302 within the service area 306. The predator management engine 312 can also populate an entry within an allocation table 314 stored within the volatile data memory 106 corresponding to the remapped memory address location. For example, the predator management engine 312 can write the new address location into the allocation table 314 by sending a message across the bus controller 108. The CPU 102 need not be aware of the reallocation occurring within the non-volatile memory segments 202, 204. The predator management engine 312 can be implemented within the software and/or hardware of the main non-volatile memory segment 202. In some implementations, the predator management engine 312 is implemented within the high endurance, non-volatile memory segment 204.

In some implementations, the allocation table 314 contains both the initial addresses within the main non-volatile memory segment 202 and the reallocated addresses within the high endurance, non-volatile memory segment 204 such that the allocation table 314 can be used whenever transferring data in and out of the non-volatile memory segments 202, 204. Upon system start-up, the allocation table 314 can be populated based upon the reallocated addresses written into the service area 306 of each block of the non-volatile memory segment 204 or, if the block has not been reallocated, the address of the memory block 302. There are several advantages of writing reallocated addresses in the memory 204 rather than the main memory 202. The address reallocation can be written in the service area 306 and data can be written to the reallocated address in a single write operation for better performance. At start up, the service area 306 of the memory 204 can be read to fill the allocation table 314. A read to main memory 202 is not required which can be large. Thus, the best performance can occur at start up when only the service area 306 of small segment of memory 204 is read.

When the CPU 102 modifies the contents of the memory block 302 by sending a write request across the data bus 114, the bus controller 108 can send the request to the volatile data memory 106 where a look-up can be made within the allocation table 314. The data can then be modified using the address retrieved. When modifying the contents of the high endurance, non-volatile memory segment 204, one or more wear-leveling techniques can be applied to increase the overall endurance of the high endurance, non-volatile memory segment 204. For example, the contents of the memory block 302, when modified, may be written to a different memory location within the high endurance, non-volatile memory segment 204 (e.g., a different memory page within the memory block 302 or a different memory block location). The allocation table 314 can be updated accordingly when the data is transferred to a new memory location.

The previous location of the contents of the reallocated memory block can be marked as garbage by a garbage collection engine 310. At a later time, the garbage collection engine 310 can erase sections of the high endurance, non-volatile memory segment 202 which are marked as garbage. In some implementations, the garbage collection engine 310 can also be used to erase contents of the main non-volatile memory segment 202. The garbage collection engine 310 can be implemented within the hardware and/or software of the main non-volatile memory segment 202 or the high endurance, non-volatile memory segment 204.

First Example Reallocation/1 Wear Leveling Technique

Figure 4:
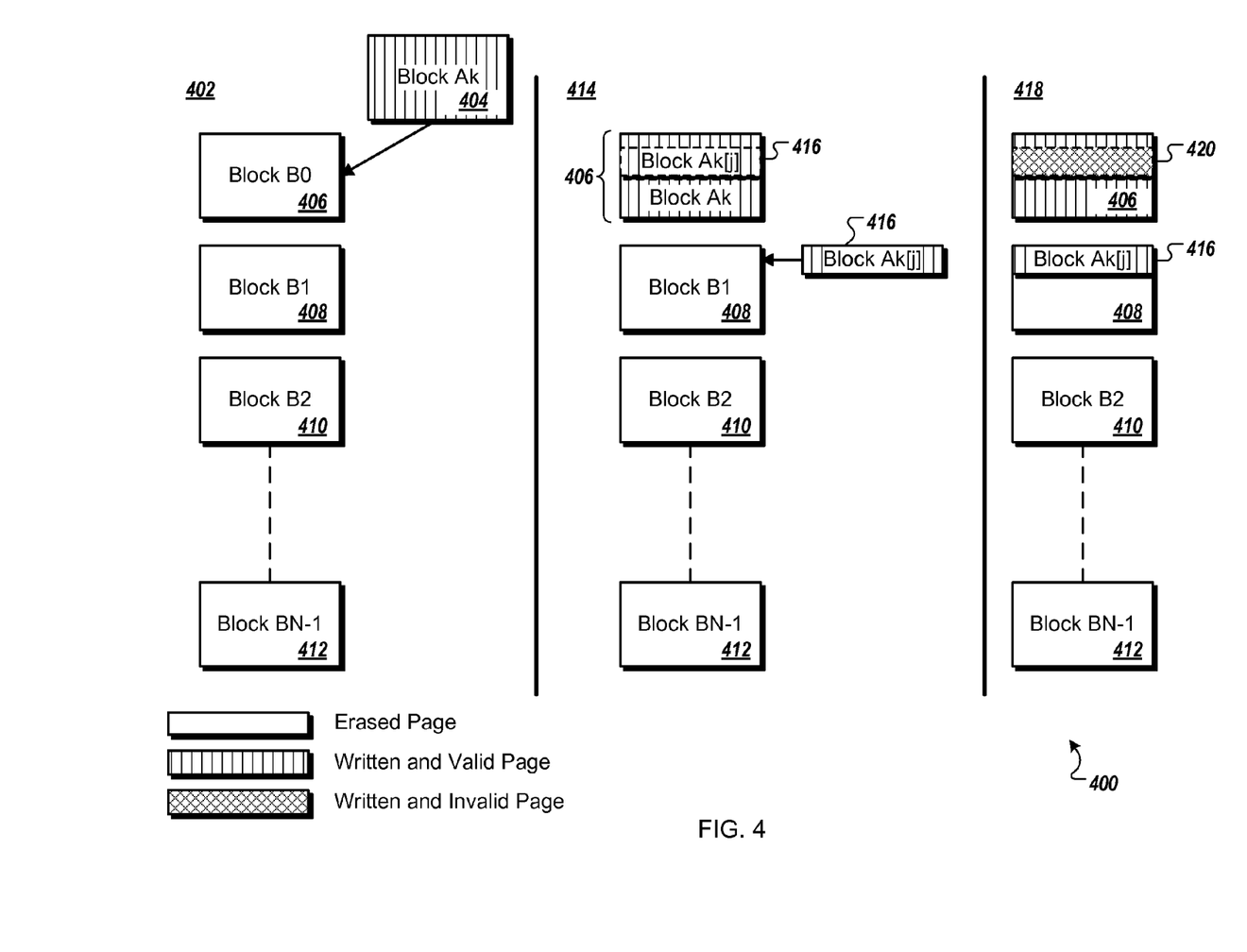
FIG. 4 is a sequence diagram illustrating an example process for transferring a software object to a high endurance, non-volatile memory segment from a main non-volatile memory segment and providing wear-leveling to the high endurance, non-volatile memory segment.

FIG. 4 is a sequence diagram illustrating an example process for transferring a software object to a high endurance, non-volatile memory segment 400 from a main non-volatile memory segment and providing wear-leveling to the high endurance, non-volatile memory segment 400. As shown within a first lane 402, a software object written into a block Ak 404 is being remapped into a block B0 406. In some implementations, the block Ak 404 has been identified as a predator software object, for example by the predator detection engine 308 as described in FIG. 3. The block Ak 404, for example, can reside in the main non-volatile memory segment 202 (as shown in FIG. 2) while the block B0 406 can reside in the high endurance, non-volatile memory segment 204. In this example, the block B0 406 is the first in a series of blocks spanning a block B1 408, a block B2 410, through a block BN-1 412. The blocks B0 406, B1 408, B2 410, and BN-1 412 are all initially erased. Each block 46, 408, 410, and 412 can include any number of pages of non-volatile memory.

As shown in a second lane 414, the block B0 406 is written and valid, containing the contents of the block Ak 404. A memory page Ak[j] 416 within the block B0 406 is being modified. Because the non-volatile memory is only overwritten through an erase-write cycle, and the non-volatile memory is only page or block-erasable regardless of the write size, rather than erasing the block B0 406, the contents of the memory page Ak[j] 416 are reallocated to a new memory location. As shown in the lane 414, the contents of the memory page Ak[j] 416 are transferred to the next block of memory, the block B1 408. If an erased page had been available within the block B0 406, in some implementations, the contents of the memory page Ak[j] 416 could have instead been transferred internally within the block B0 406.

The original location of the memory page Ak[j] 416 is marked as invalid, as shown by an invalid section 420 of the block B0 406 within a third lane 418. In some implementations, the memory contents can be marked as invalid by setting a valid flag (e.g., stored within the service area 306 of the block B0 406 as described in FIG. 3). The block B1 408 now contains the contents of the memory page Ak[j] 416.

Figure 5:
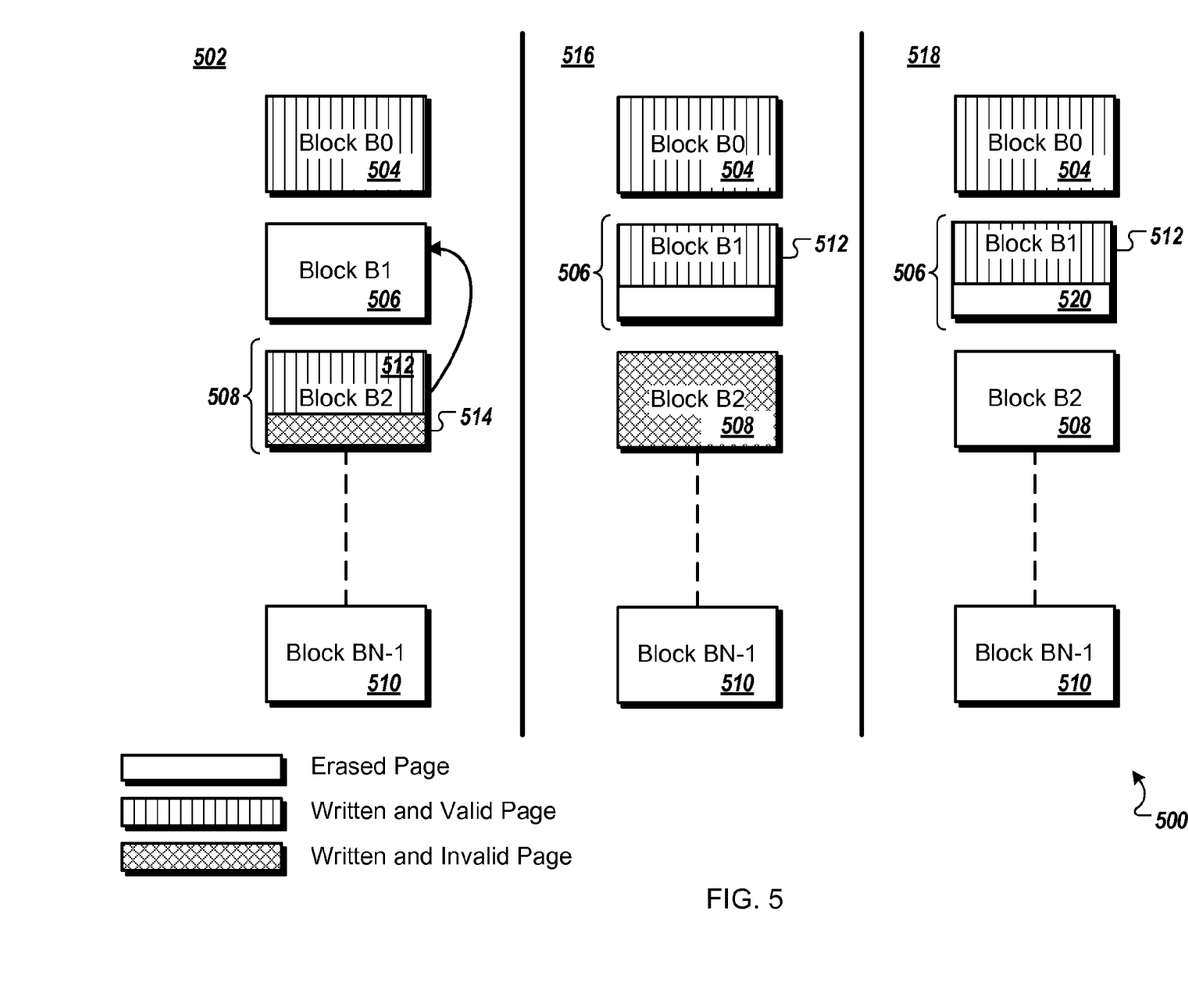
FIG. 5 is a sequence diagram illustrating an example process for providing wear-leveling to a high endurance, non-volatile memory segment.

FIG. 5 is a sequence diagram illustrating an example process for providing wear-leveling to a high endurance, non-volatile memory segment 500. As shown within a first lane 502, a block B0 504 is the first in a series of memory blocks spanning a block B1 506, a block B2 508, through a block BN-1 510. The memory blocks B0 504, B1 506, B2 508, and BN-1 510, for example, can be included in the high endurance, non-volatile memory segment 204 (e.g., as shown in FIG. 2). The blocks B1 506 and bN-1 510 are initially erased. The block B0 504 is fully written and valid. The block B2 508 has one or more written and valid pages 512 and one or more written and invalid pages 514. The block B2 508 has no erased space left for writing additional pages of data.

To provide wear-leveling to the non-volatile memory 500, the written and valid page(s) 512 of the block B2 508 are reallocated to the erased block B1 506. In some implementations, the wear-leveling method can be triggered upon the filling of all of the erased space within the block B0 504 or, alternatively, upon the next write to the memory segment 500 after the last erased page of the block B0 504 has been written. As shown in a second lane 516, the Block B1 506 is now mostly written and valid due to the introduction of the memory page(s) 512. The block B2 508 is fully written and invalid due to invalidating the previous location(s) of the memory page(s) 512.

In a third lane 518, the block B2 508 is fully erased. In some implementations, the reallocation of memory pages and erasure of memory blocks can be achieved using the garbage collection engine 310 (as described in FIG. 3). The next write to the non-volatile memory 500, for example, can be made to a first erased page of one or more erased pages 520 in the block B1 506.

Figure 6:
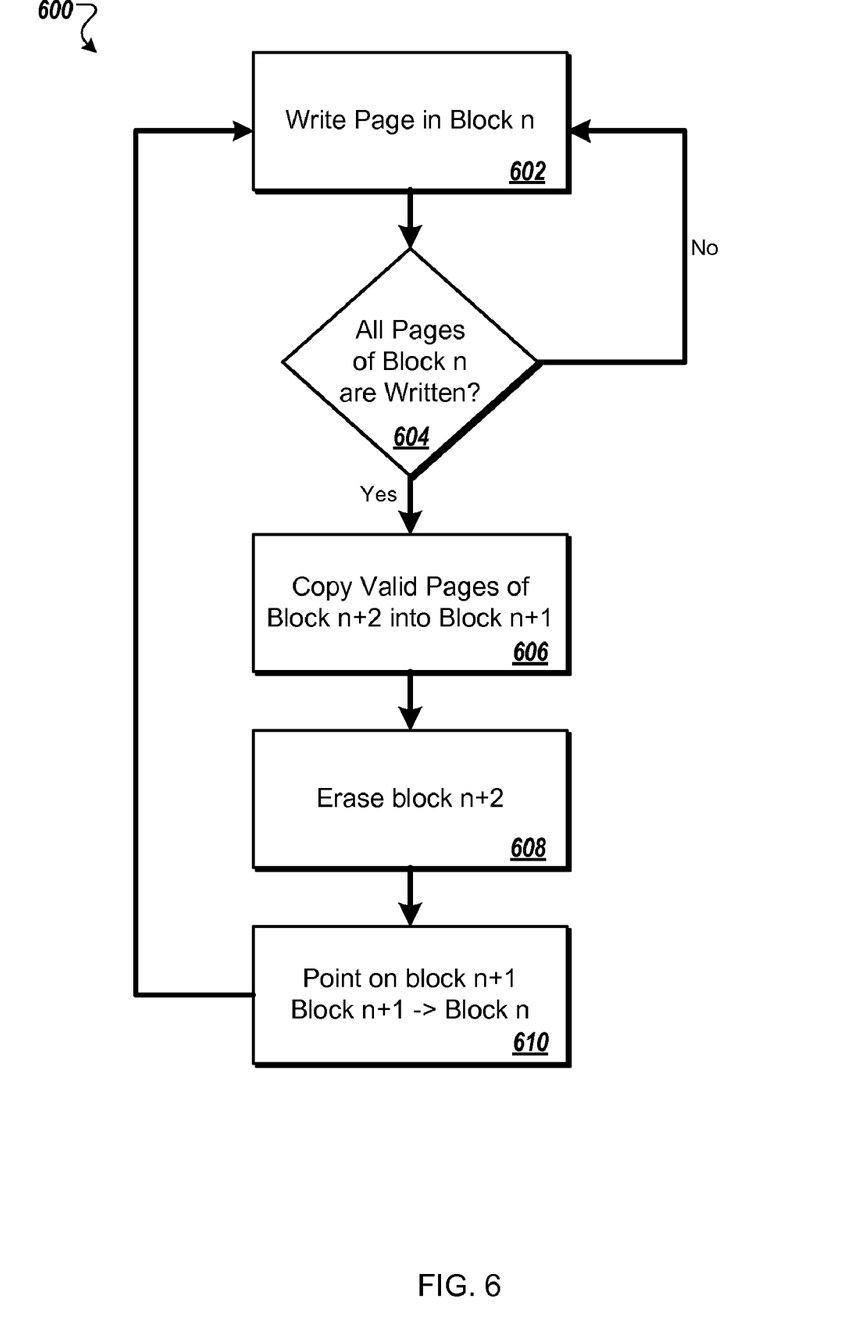
FIG. 6 is a flow diagram illustrating an example process for providing wear-leveling to the high endurance, non-volatile memory segment.

FIG. 6 is a flow diagram illustrating an example process 600 for providing wear-leveling to the high endurance, non-volatile memory segment. The process 600, for example, could be used in executing the steps as diagrammed in relation to the high endurance, non-volatile memory segment 400 as described in FIG. 4 and/or the high endurance, non-volatile memory segment 500 as described in FIG. 5.

The process 600 begins with writing a page in the memory block n (602). The page being written into the memory block n, for example can be remapped from a low endurance non-volatile memory segment (e.g., the main non-volatile memory segment 204 as shown in FIG. 2) to a high endurance, non-volatile memory segment (e.g., the high endurance, non-volatile memory segment 204 as shown in FIG. 2). In some implementations, the predator management engine 312 (as shown in FIG. 3) can reallocate the page from the main non-volatile memory segment 202 to the high endurance, non-volatile memory segment 204. In another example, the page being written into the memory block n can be reallocated within a high endurance, non-volatile memory segment due to modification of the contents of the page. When a page has been reallocated, the previous location of the page can be marked as invalid. In some implementations, a page is marked as invalid within a memory block by setting an invalid flag within the service area of the memory block (e.g., the service area 306 as described in FIG. 3).

While there are erased pages within the memory block n (604), pages can continue to be written within the memory block n (602). Once all of the pages within the memory block n are full (604), the written and valid pages of the memory block n+2 are copied into an erased portion of the memory block n+1. For example, the memory block n+2 may contain one or more pages which are written but have been invalidated (e.g., removed, reallocated, etc.) and one or more erased pages as well as one or more pages which are written and valid. Only the pages which are written and valid are copied into the memory block n+1. In some implementations, when a page is copied from the memory block n+2 to the memory block n+1, the page within the memory block n+2 can then be marked as invalid. For example, after the memory pages 512 are copied from the block B2 508 to the block B1 506, as shown in FIG. 5, the initial locations of the memory pages 512 within the block B2 508 are marked as invalid.

Once all of the written and valid pages within the memory block n+2 have been copied into the memory block n+1, the memory block n+2 is erased (608). In some implementations, the garbage collection engine 310 (as shown in FIG. 3) can reallocate pages between memory blocks and erase invalid memory blocks. The process 600 continues by incrementing the memory block n pointer to point to the memory block n+1. For example, as shown in FIG. 5, the memory block n pointer can initially point to the block B0 504 as shown within the lane 502 and, upon erasure of the block B2 508, the memory block n pointer can be incremented to point to the block B1 506 as shown within the lane 518. The process 600 continues to fill the pages of the memory block n+1 (e.g., the empty pages 520 within the block B1 506) until the memory block n+1 is entirely written.

Second Wear Leveling Technique

Figure 7:
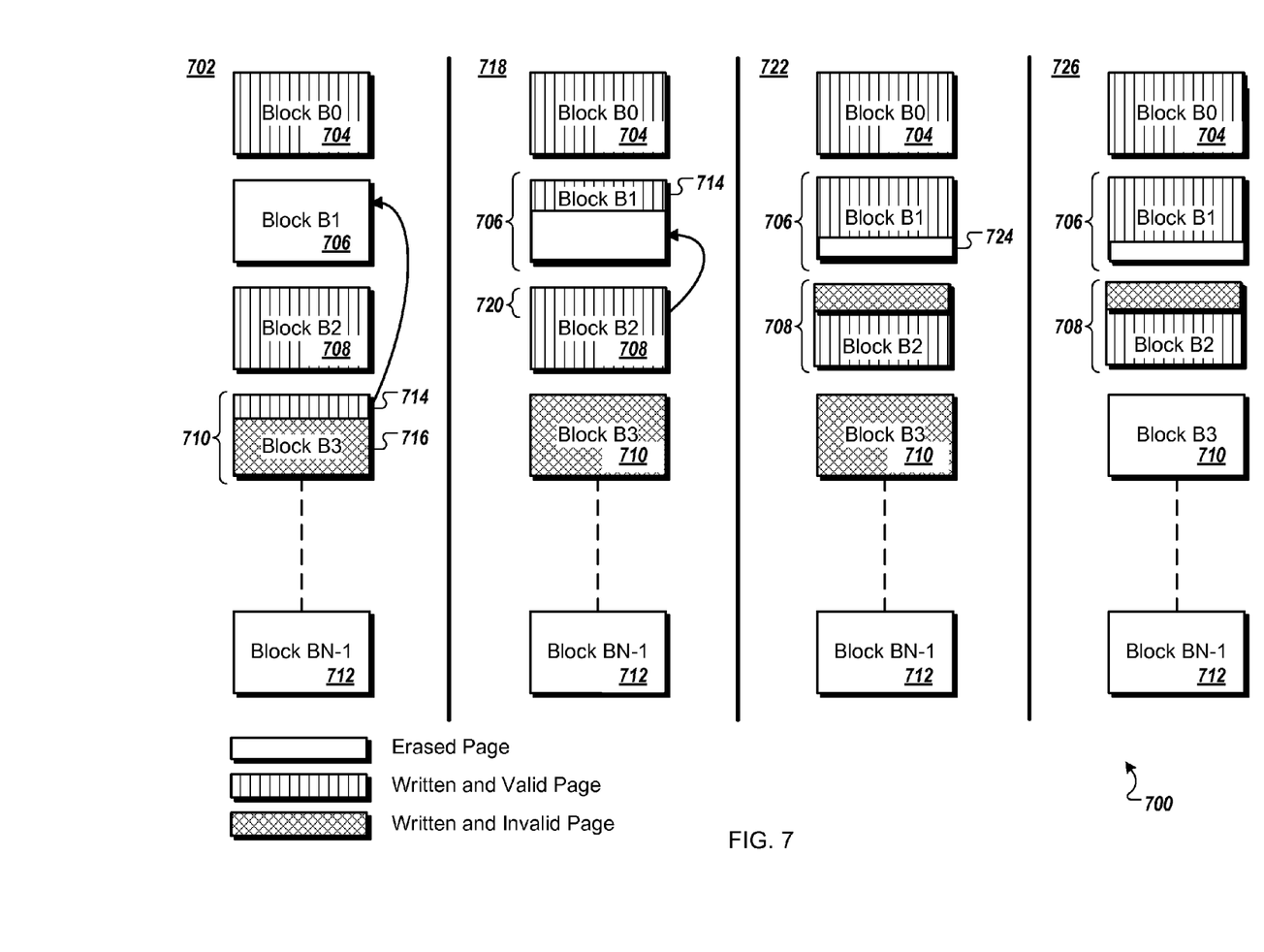
FIG. 7 is a sequence diagram illustrating a second example process for providing wear-leveling to a high endurance, non-volatile memory segment.

FIG. 7 is a sequence diagram illustrating a second example process for providing wear-leveling to a high endurance, non-volatile memory segment 700. As shown within a first lane 702, a block B0 704 is the first in a series of memory blocks spanning a block B1 706, a block B2 708, a block B3 710, through a block BN-1 712. The memory blocks B0 704, B1 706, B2 708, B3 710, and BN-1 712, for example, can be included in the high endurance, non-volatile memory segment 204 (e.g., as shown in FIG. 2). The blocks B1 706 and bN-1 712 are initially erased. The blocks B0 704 and B2 708 are fully written and valid. As such, in this example, starting with a block n pointer upon the block B0 704, all of the pages of the block n+2 (as described in the process 500 of FIG. 5) are written and valid, such that the wear-leveling process 500 does not apply to this circumstance. The block B3 710 has one or more written and valid pages 714 and one or more written and invalid pages 716. The block B3 710 contains no erased memory pages for writing additional pages of data.

To provide wear-leveling to the non-volatile memory 700, the written and valid page(s) 714 of the block B3 710 are reallocated to the erased block B1 706. As shown in a second lane 718, the Block B1 706 is now partially written and valid due to the introduction of the written and valid page(s) 714. The block B3 710 is written and fully invalid because the previous location(s) of the written and valid page(s) 714 have been marked as invalid.

One or more written and valid pages 720 are reallocated from the block B2 708 to the block B1 706. As shown in a third lane 722, the block B1 706 is now filled except for a last erased page 724. The last erased page 724 is available to accept the next write to the non-volatile memory 700. In this manner, a deadlock situation can be avoided by leaving space for a write which may occur before the erasure of the invalidated block. As shown in a fourth lane 726, once the reallocations have been made, the block B3 710 can be erased.

Figure 8:
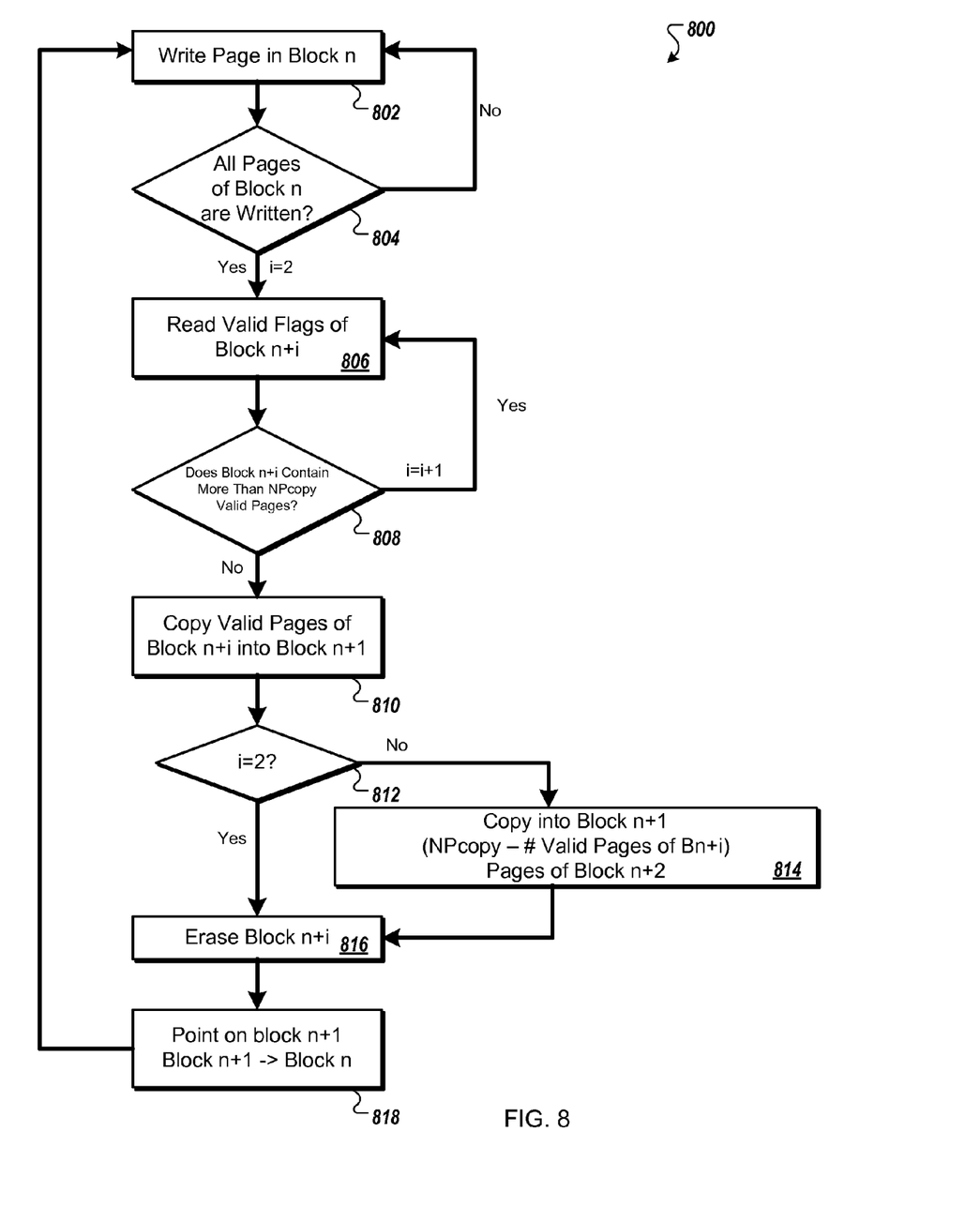
FIG. 8 is a flow diagram illustrating a second example process for providing wear-leveling to a high endurance, non-volatile memory segment separate from a main non-volatile memory segment.

FIG. 8 is a flow diagram illustrating a second example process 800 for providing wear-leveling to a high endurance, non-volatile memory segment separate from a main flash memory segment. The process 800, for example, could be used in executing the steps as diagrammed in relation to the high endurance, non-volatile memory segment 700 as described in FIG. 7.

The process 800 begins with writing a page in the memory block n. The page being written into the block n, for example, can be remapped from a low endurance non-volatile memory segment (e.g., the main non-volatile memory segment 204 as shown in FIG. 2) to a high endurance, non-volatile memory segment (e.g., the high endurance, non-volatile memory segment 204 as shown in FIG. 2). In some implementations, the predator management engine 312 (as shown in FIG. 3) can reallocate the page from the main non-volatile memory segment 202 to the high endurance, non-volatile memory segment 204. In another example, the page being written into block n can be reallocated within a high endurance, non-volatile memory segment due to modification of the contents of the page. When a page has been reallocated, the previous location of the page can be marked as invalid. In some implementations, a page is marked as invalid within a memory block by setting an invalid flag within the service area of the block (e.g., the service area 306 as described in FIG. 3).

While there are erased pages within the memory block n (804), pages can continue to be written within the memory block n (802). Once all of the pages within the memory block n are full (804), the valid flags for all pages within the memory block n+2 are read (806). The valid flags, for example, can be stored within the service area 306 (as shown in FIG. 3) of the memory block n+2. If block n+i contains more than NPcopy valid pages (808), the pointer to the memory block n+2 is incremented, and the valid flags of the next memory block n+i are read (806). NPcopy is the number of valid pages that are copied into a free block. For example, as shown in FIG. 7, beginning with the memory block n pointer at the block B0 704, the memory block n+2, the block B2 708, is fully written and valid.

The process 800 continues to increment the pointer to the memory block n+i and to read the valid flags of the memory block n+i while the process 800 determines that memory block n+i contains more than NPcopy valid pages (808).

To be efficient, NPcopy should fit the following equation which represents the minimum number of pages that can be copied in a free block during wear leveling: (NPcopy+1)*(NBtot−1)>(NPb*NBpred), where NBtot is the total number of blocks of the memory 204 (e.g., NBtot is equal to 64 for a 64 KB memory segment with blocks of 1 KB), NPb is the number of pages in a block (e.g., NPb is equal to 8 for an 8 pages per block architecture), and NBpred is the maximum number of block predators that can move to memory 204. NBpred is generally known by the application user. With this constraint the timing of the wear leveling operation can be reduced without any incidence on the endurance capacity provided by the wear leveling operation.

Continuing with the previous example, in incrementing the memory block pointer to n+3, the memory block B3 710 contains both one or more written and valid pages 714 and one or more written and invalid pages 716.

The valid page(s) of the memory block n+i are copied into the memory block n+1 (810). For example, the memory page(s) 714 of the block B3 710 are copied into the block B1 706.

If the pointer to the memory block n+i was incremented (e.g., i is greater than 2) (812), then a number of pages of block n+2 are copied into block n+1 (814). In this example, the number of pages of block n+2 copied into block n+1 is equal to NPcopy minus the number of valid pages of block n+i. The process 800 calculates the number of pages per memory block, decrements this quantity by one, and further decrements the value by the number of pages which were copied from the memory block n+i. For example, one or more pages 720 of the block B2 708 are reallocated to the block B1 706 such that the block B1 706, as shown in the lane 722, contains one erased page 724.

The memory block n+i is erased (816). In some implementations, the garbage collection engine 310 (as shown in FIG. 3) can reallocate pages between memory blocks and erase invalid memory blocks. The process 800 continues by incrementing the memory block n pointer to point to the memory block n+1. For example, as shown in FIG. 7, the memory block n pointer can initially point to the block B0 704 as shown within the lane 702 and, upon erasure of the block B3 710, the memory block n pointer can be incremented to point to the block B1 706 as shown within the lane 726. The process 800 continues to fill the pages of the memory block n+1 (e.g., the empty page 724 within the block B1 706) until the memory block n+1 is entirely written.

Figure 9:
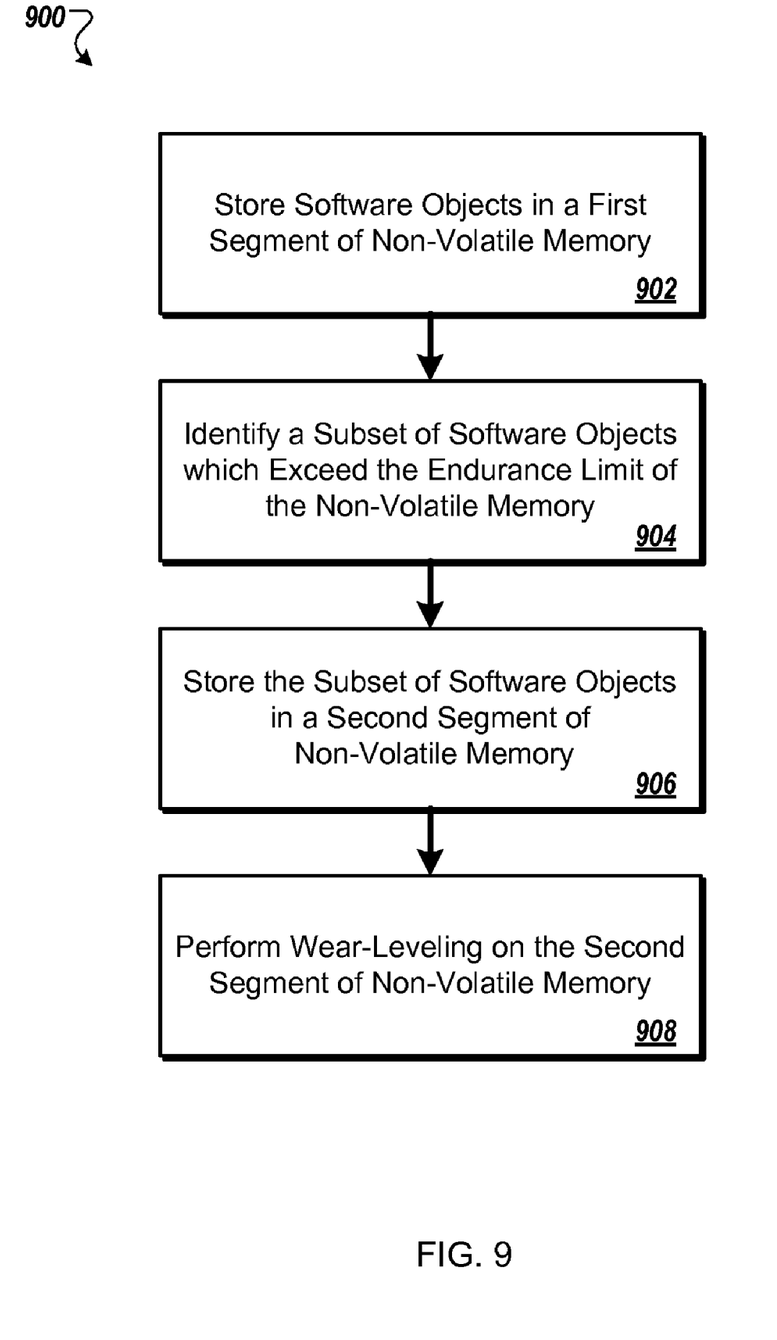
FIG. 9 is a flow diagram illustrating an example process for identifying software object predators within a main non-volatile memory segment and reallocating the predators to a high endurance, non-volatile memory segment.

FIG. 9 is a flow diagram illustrating an example process 900 for identifying predator software objects within a main non-volatile memory segment and reallocating the predators to a high endurance, non-volatile memory segment. The process 900, for example, can be used within the microcontroller 100 as described in FIG. 1.

The process 900 begins with storing a set of software objects in a first segment of non-volatile memory (902). The software objects can include, for example, program instructions, data files, operating system information, and/or virtual machine code. Different software objects can have different requirements. For example, some software objects, such as program instructions, are generally static but can require fast access times. Other software objects, such as the file allocation table (FAT) of a file system, can require frequent updates. The first segment of non-volatile memory, for example, can be the main non-volatile memory segment 202 as described in FIG. 2.

A subset of software objects are identified which have an endurance requirement that exceeds the endurance limit of the non-volatile memory (904). In some implementations, a hardware or software process such as the predator detection engine 308 (as described in FIG. 3) identifies software objects which have a high frequency of updates. For example, the predator detection engine 308 can compare the number of erases made to a block of non-volatile memory to the endurance limit of the non-volatile memory. If a block of non-volatile memory approaches a threshold limit associated with the endurance of the non-volatile memory, for example, the predator detection engine 308 can detect that software object has a high endurance requirement.

The subset of software objects is stored within a second segment of non-volatile memory (906). In some implementations, the second segment of non-volatile memory is implemented within a logical partition of the memory also containing the first segment of non-volatile memory. In other implementations, the second segment of non-volatile memory is implemented within a second memory device (e.g., a physically separated embedded memory region). The second segment of non-volatile memory, for example, can be the high endurance, non-volatile memory segment 204 as described in FIG. 2. A software object identified as a predator can be reallocated to the second segment of non-volatile memory, for example, by the predator management engine 312 (as described in FIG. 3). An allocation table, such as the allocation table 314, can be updated with the new address location of the software object.

Wear leveling is performed on the second segment of non-volatile memory (908). In some implementations, the software objects within the second segment of non-volatile memory can be rotated through memory locations such that the average number of erases per memory location is lowered. For example, the second segment of non-volatile memory can include much more memory space than is required to store all of the software predator objects. Although the endurance limit of the second segment of non-volatile memory may be equivalent to the endurance limit of the first segment of non-volatile memory, the perceived endurance of the second segment of non-volatile memory can be much greater. In some implementations, the wear leveling algorithms described in relation to FIGS. 4-8 can be applied to the second non-volatile memory segment. Meanwhile, the first segment of non-volatile memory can be implemented without a wear-leveling algorithm.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made. For example, steps of one or more processes may be combined, deleted, modified, or supplemented to form further processes. As yet another example, the process steps depicted in the figures do not require the particular order shown to achieve desirable results. In addition, other steps may be provided, or steps may be eliminated, from the described processes, and other materials may be added to, or removed from, the described processes. Accordingly, other implementations are within the scope of the following claims.

What is claimed is:

1. A method comprising:
  storing a set of software objects in a first segment of a non-volatile memory;
  identifying a subset of software objects having an endurance requirement that exceeds an endurance limit of the non-volatile memory;
  storing the subset of software objects in a second segment of the non-volatile memory;
  determining a first memory block in the second segment of the non-volatile memory is filled, wherein a memory block pointer is pointing to the first memory block, the memory block pointer indicating at which block a next write should occur;

copying valid pages of a third memory block into a second memory block, the second memory block being adjacent to the first memory block, the third memory block being adjacent to the second memory block;

erasing the third memory block; and incrementing the memory block pointer to point to the second memory block.

2. The method of claim 1, where the first and second segments are associated with one or more non-volatile memory devices.

3. The method of claim 1, where the first segment stores code or data and the second segment stores data.

4. The method of claim 1, where the second segment of non-volatile memory has a higher endurance capacity than an endurance capacity of the first segment of non-volatile memory.

5. The method of claim 1, where identifying a subset of software objects further comprises:

detecting whether a number of erase operations of a page or block containing a software object approaches an erase operation limit associated with the non-volatile device; and responsive to the detecting, moving the page or block to the second segment.

6. The method of claim 5, where detecting comprises:

counting the number of erase operations performed on the page or block; and storing the number in the page or block.

7. The method of claim 1, further comprising:

updating a mapping between a logical address of a page or block in the first segment and a new physical address of the page or block in the second segment.

8. The method of claim 7, comprising:

storing the mapping in the page or block.

9. The method of claim 1, where an endurance capacity of the second segment is calculated in accordance with a software application endurance requirement.

10. The method of claim 1, further comprising:

determining if the software object is smaller than a block; and if so, moving the entire block containing the software object to the second segment.

11. The method of claim 1, where the subset of software objects is identified upon initialization.

12. The method of claim 1, wherein the subset of software objects is stored in the second segment of non-volatile memory upon initialization.

13. A method comprising:

storing a set of software objects in a first segment of a non-volatile memory;

identifying a subset of software objects having an endurance requirement that exceeds an endurance limit of the non-volatile memory;

storing the subset of software objects in a second segment of the non-volatile memory;

determining a first memory block in the second segment of the non-volatile memory is filled, wherein a memory block pointer is pointing to the first memory block, the memory block pointer indicating at which block a next write should occur;

copying valid pages of a subsequent memory block into a second memory block, the second memory block being adjacent to the first memory block, the subsequent memory block having more than a threshold number of valid pages that are copied into the subsequent memory block;

erasing the subsequent block; and incrementing the memory block pointer to point to the second memory block.

14. The method of claim 13, further comprising:

in response to copying valid pages of a subsequent memory block into a second memory block:

determining the subsequent memory block is located more than two blocks subsequent from the first memory block; and copying the valid pages of a fourth memory block into the second memory block, wherein the fourth memory block is located two blocks subsequent to the first memory block.

15. The method of claim 13, where the second segment of non-volatile memory has a higher endurance capacity than an endurance capacity of the first segment of non-volatile memory.

16. The method of claim 13, where identifying a subset of software objects further comprises:

detecting whether a number of erase operations of a page or block containing a software object approaches an erase operation limit associated with the non-volatile device; and responsive to the detecting, moving the page or block to the second segment.

17. The method of claim 13, further comprising:

updating a mapping between a logical address of a page or block in the first segment and a new physical address of the page or block in the second segment.

18. The method of claim 13, further comprising:

determining if the software object is smaller than a block; and if so, moving the entire block containing the software object to the second segment.

19. The method of claim 13, where the subset of software objects is identified upon initialization.

* * * * *